(No Model.)
P. L. KIMBALL.
TELESCOPIC SKIMMER.
No. 359,510. Patented Mar. 15, 1887.
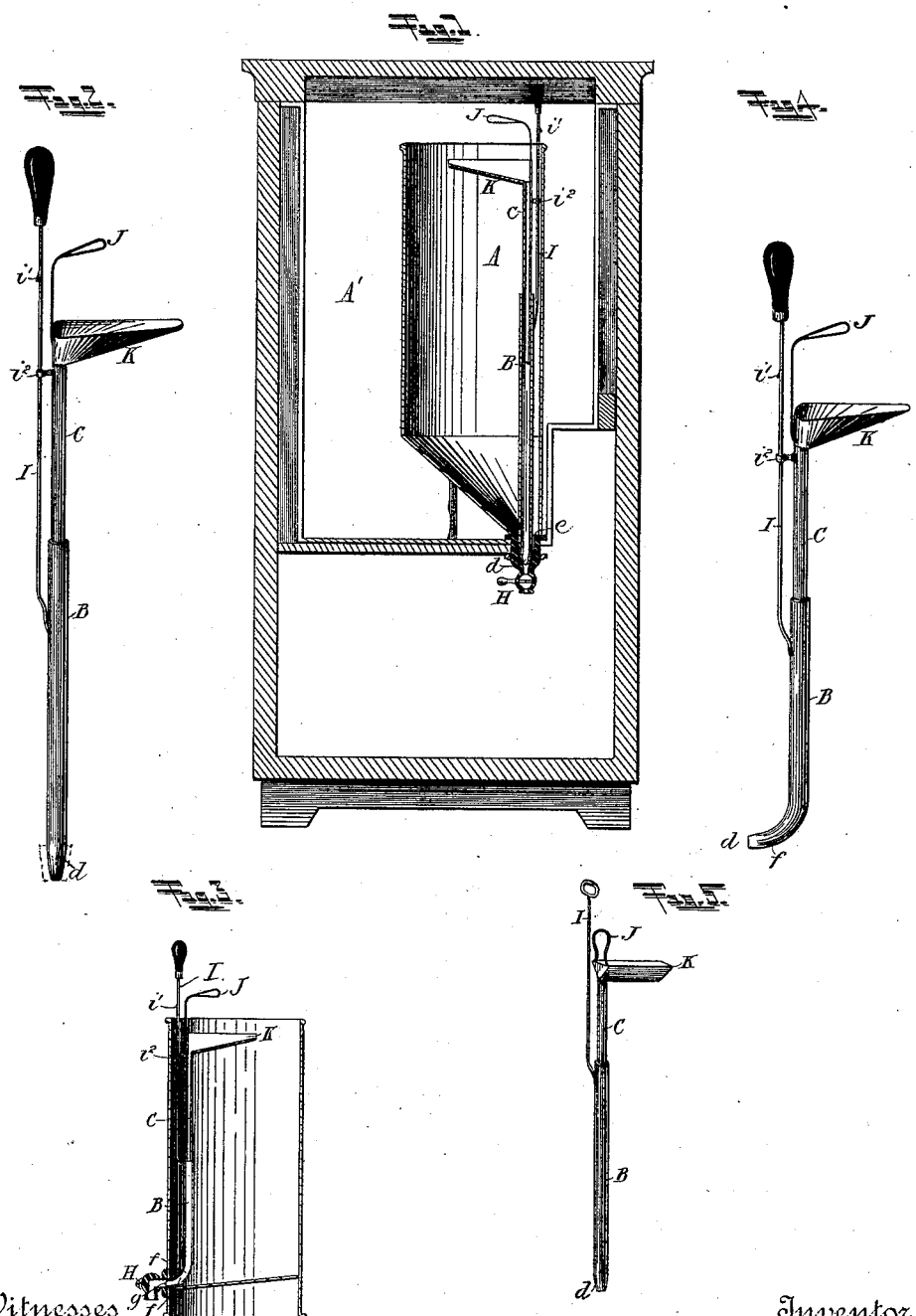

United States Patent Office.

PERLEY L. KIMBALL, OF BELLOWS FALLS, VERMONT, ASSIGNOR TO THE VERMONT FARM MACHINE COMPANY, OF SAME PLACE.

TELESCOPIC SKIMMER.

SPECIFICATION forming part of Letters Patent No. 359,510, dated March 15, 1887.

Application filed September 7, 1886. Serial No. 212,965. (No model.)

To all whom it may concern:

Be it known that I, PERLEY L. KIMBALL, of Bellows Falls, in the county of Windham and State of Vermont, have invented certain new and useful Improvements in Telescopic Skimmers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to certain specialties of construction in telescopic milk-skimming devices for separating cream from milk, and whereby the devices may be easily applied or removed from the vessel or vessels without changing their construction, and whereby the cream may be first withdrawn, leaving the milk in the vessel.

The invention is adaptable either for vessels which are made with flat or nearly flat bottoms, and which are hence capable of standing on the floor or on a bench, or for that class in which the discharge-outlet and faucet are underneath the vessel or underneath the vessel and its surrounding tank.

Figure 1 illustrates my invention applied to a vessel of that variety in which the cream or other contents are withdrawn through the bottom of the milk-vessel, or through it and its surrounding water tank or vessel, the whole being in vertical section; Fig. 2, a detached enlarged perspective view of the removable telescopic skimmer shown in Fig. 1. Fig. 3 illustrates in section the invention as adapted for and applied to a vessel in which the discharge is at the side instead of at the bottom; Fig. 4, a detached perspective view of the telescopic skimmer shown in Fig. 3, and Fig. 5 a modified form of skimmer.

A is the milk-vessel, and A' illustrates a water tank or vessel in which the milk-vessel is usually placed for raising cream, both vessels being shown within a cabinet or case.

Referring first to Figs. 1 and 2, B C are the telescopic tubes, one of which is, as usual, inserted in and slides within the other; but instead of the lower one being permanently secured at its lower end to the vessel, it is made tapering, as seen at $d$, that it may be tightly inserted and pressed into a corresponding socket, $e$, to make a water-tight joint, and from which it may readily be removed at will. This joint may hold by mere frictional contact of the metal, or may have a rubber, cork, or other packing, if desired, as indicated by dotted lines in Fig. 2. The can-bottom converges to a point, and when the skimmer is being put in for use it is bound to find its own proper place in the faucet, inasmuch as this bottom of the can serves to guide and direct it, and this converging point may be at any desired place in the bottom, whether at its front or elsewhere.

In Figs. 3 and 4 the lower end of the tube B is made with a curve or crook, $f$, which also has its end tapering, and this crook adapts it for ready insertion in a corresponding socket, $g$, in the side of the vessel to form a water-tight joint. An appropriate stop-cock, H, serves to let off or to stop the flow of cream at will, it being understood that when the tubes are applied ready for use they are adapted for withdrawing through them and for discharging the cream, while leaving the milk in the vessel, whereas when removed from or not inserted in the vessel the milk or lower body of the liquid would discharge itself first. The removable tubes render our vessels adapted for discharging either the cream first or the milk first at will, and by the agency of one and the same faucet or stop-cock. This removability of the tubes has many advantages, among which may be named the facility of cleansing them or of repairing them, if need be, and of cleansing the interior of the vessel; the use of the same vessel either for ordinary purposes or for cream raising and discharging; the dispensing with any soldering, packing, or equivalent means for uniting the lower tube to the vessel, and the avoidance of risking a leakage by every strain given to the stop-cock by the working or leverage of the tube when the cock and tube are permanently connected, for the lower tube is so applied to the vessel that any turning of it in its water-tight bearing does not tend to break anything, nor to loosen the stop-cock from its hold.

To the lower tube, B, is attached a handle,

I, by which, when the tube is loosened from the vessel, both tubes may be inserted or lifted and removed, and this handle serves, by means of a loop or stop, $i'$, and also a hook or eye, $i^2$, on the upper tube, C, to steady and guide each of these tubes relatively to the other one, and this upper tube, C, has also a handle, J, by which it may be raised or lowered to any desired degree in order to bring the scoop K to the proper height to allow the cream, when formed or raised, to flow into it, and thence descend through both tubes to be discharged. The stop $i'$ serves to limit the upward pull of the upper tube, C, and prevents its being unintentionally pulled entirely out, inasmuch as the hook or eye $i^2$ comes in contact with this stop $i'$. The scoop K should have a length sufficient—that is, should reach far enough out into the vessel—to afford facility for all or the greater body of the cream to flow into it, and the provision for turning it about in a horizontal plane to a limited degree allows the cream to be better gathered, and in such turning there can be no harm done to the tight joint of the straight tube, whether the lower tube may chance to turn with the upper one or not, and with the tube having the crook no harm can be done to its water-tight joint, inasmuch as the line of direction in which the crook is inserted in the stop-cock or faucet is at right angles to the main length of the tube. The top line of the scoop K should be substantially horizontal, and the scoop or skimmer proper may be of varying forms; but the illustrations show two preferred forms—viz., one in Figs. 1, 2, 3, and 4 and one in Fig. 5.

It will be observed that in Figs. 1 and 2 the improvements are applied to what is known as the "Cabinet Can"—that is to say, one not adapted to rest with its bottom on a floor or bench—while in Figs. 3 and 4 the crook adapts them to a vessel which itself can stand on a level, the bottom being shown as inclined, and preferably this bottom is inserted in the cylinder after the latter is completed, the lower part of the cylinder serving instead of feet.

In the form shown in Fig. 5 the stop $i'$ and eye or hook $i^2$ are not shown, and the form of the handle J is somewhat different from that in the other figures, and the scoop is triangular in cross-section. The omission of the stop and hook permit a freer turning around of the scoop when desired.

In all the figures it will be observed that as the scoop-tube C can be moved up and down in the larger tube, B, this allows the top of the contents of the can to be run off through these tubes, and allows the lowering of the scoop to any point desired to take off all the cream.

The scoop K, as shown in full in Figs. 2 and 4 and in section in Figs. 1 and 3, resembles in form a deep shovel or scoop, being deep near its junction with the tube C and gradually shallower toward its outer end, and having a curved or oval top line and arched or rounded on its under side. This permits an easy admission into it of the cream, and also an easy gravitating downward flow from all points in the scoop to its tube C, at the top of which tube all the inclines of this scoop converge. Thus the scoop clears itself continuously of the incoming cream, with no liability of its clinging or remaining there undischarged. In Fig. 5 the general object and function of the scoop are the same; but its sides meet at an angle at its bottom, instead of having a gradual or descending curve, and its ends are triangular in shape.

The tubes are preferably not inserted in the can until the cream is raised. They are then put in and the cream drawn off, and they are then withdrawn from the can.

I claim—

1. In a milk-setting vessel, the combination, with an outer discharging-faucet affixed to the vessel and having its inlet made with an internally-tapering mouth, as described, of the telescopic tubes B C, the lower one, B, having the external terminal taper, and thus adapted to make a water-tight joint, and both tubes thus being readily insertible for use within the vessel and readily removed together from the same.

2. In a milk-setting vessel, the combination, with an outlet-faucet affixed to the side of the vessel, of removable telescopic tubes for discharging the cream, the lower one of which tubes has a bend or crook adapted to form a water-tight joint with such side faucet, and a handle for the insertion and removal of both the tubes, all substantially as set forth.

3. In combination, the telescopic tubes B C and their respective handles I J, both tubes being insertible in and together removable from the inside of the vessel, and the stop or loop $i'$ on said handle I, and the guide hook or eye $i^2$ on tube C, serving to steady and guide the tubes and also to limit the upward movement of the upper tube, as set forth.

4. In a milk-setting device, telescopic tubes B C, both connectedly insertible in and removable from a faucet communicating by an internally-tapered inlet with the interior of a vessel, the upper one, C, being integral with or having fixedly secured to it a skimmer cup or bowl, whose horizontal top line is a continuous curve and whose under side is arched or rounded and its interior gradually deepened from its extremity to its junction with its delivery-tube.

5. In combination with a milk-vessel having a bottom converging to a point, and there provided with an outlet-passage having a mouth with an interior taper, a telescopic skimmer having an external terminal taper adapted for ready insertion in the interior taper of the outlet-passage or faucet located at such converging point.

6. In combination with a milk-receptacle having an outlet-cock, the described cream gathering, conveying, and discharging device, consisting of telescopic tubes and their cream-receiving scoop, one of the tubes being provided with a handle having a stop, $i'$, and the other having an eye or hook, $i^2$, all substantially as shown and described.

7. In combination with a milk-receptacle having an outlet-cock, a cream gathering, conveying, and discharging device, consisting of telescopic tubes adapted both for use within the receptacle, their cream-receiving scoop, one of the tubes having a handle, I, provided with a stop, $i'$, and the other having an eye or hook, $i^2$, the outlet-passage of the can being tapered interiorly and the extremity of one of the tubes being tapered exteriorly to afford means for instant insertion and adjustment to a tight position, all substantially as set forth.

PERLEY L. KIMBALL.

Witnesses:
A. J. HOLLEY,
A. R. SLADER.